Figure 1:
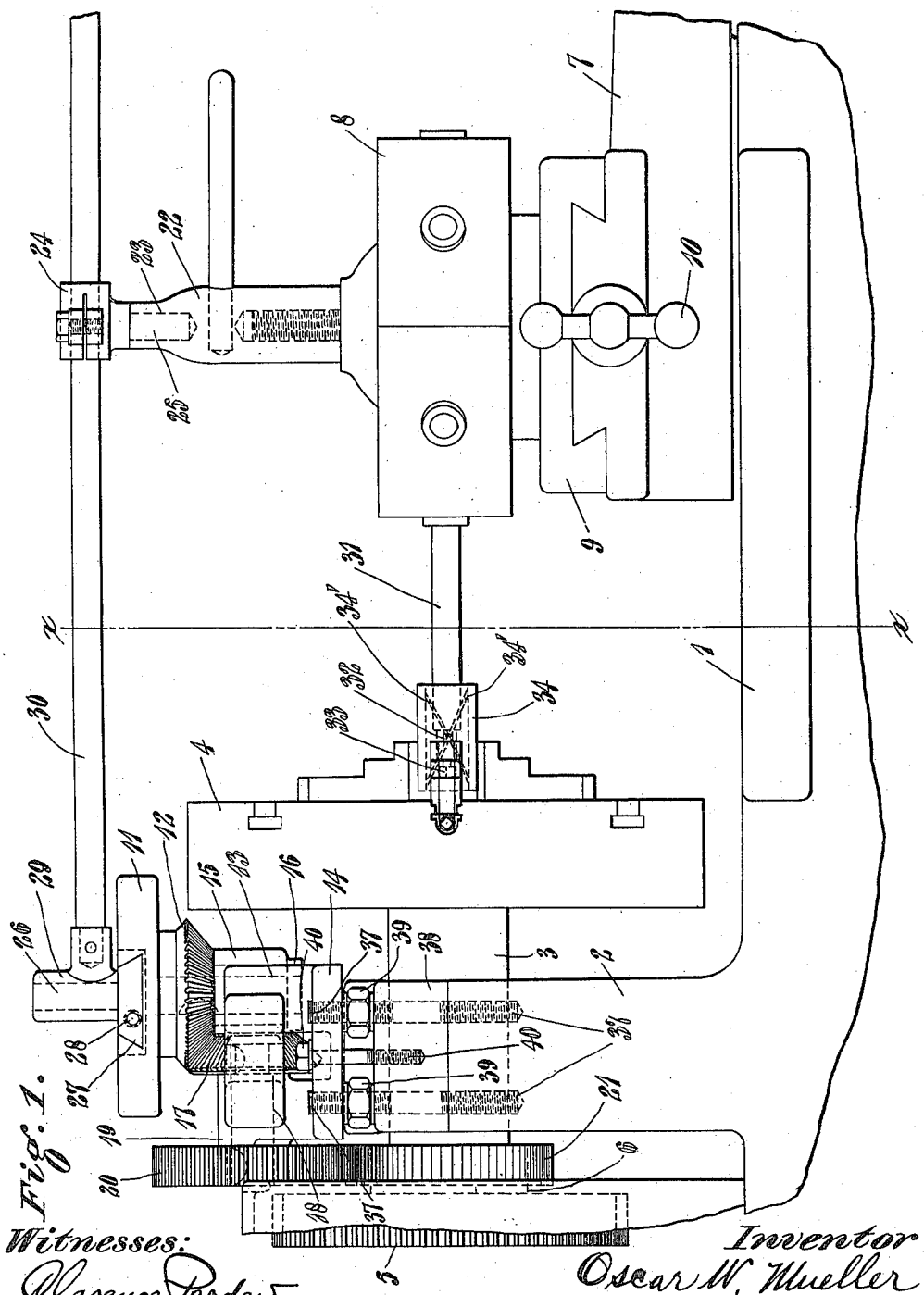

O. W. MUELLER.
TURNING OR BORING APPLIANCE.
APPLICATION FILED JUNE 13, 1914.

1,153,241.

Patented Sept. 14, 1915.
2 SHEETS—SHEET 1.

Witnesses:
Clarence Perdew
Catherine Doran

Inventor
Oscar W. Mueller
By James N. Ramsey
Attorney

COLUMBIA PLANOGRAPH CO., WASHINGTON, D. C.

O. W. MUELLER.
TURNING OR BORING APPLIANCE.
APPLICATION FILED JUNE 13, 1914.
1,153,241.
Patented Sept. 14, 1915.
2 SHEETS—SHEET 2.
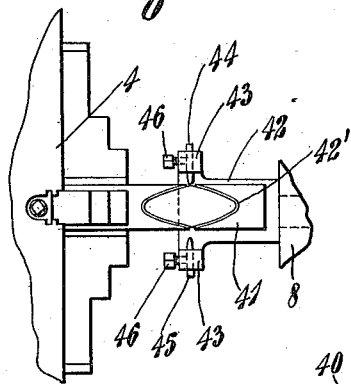
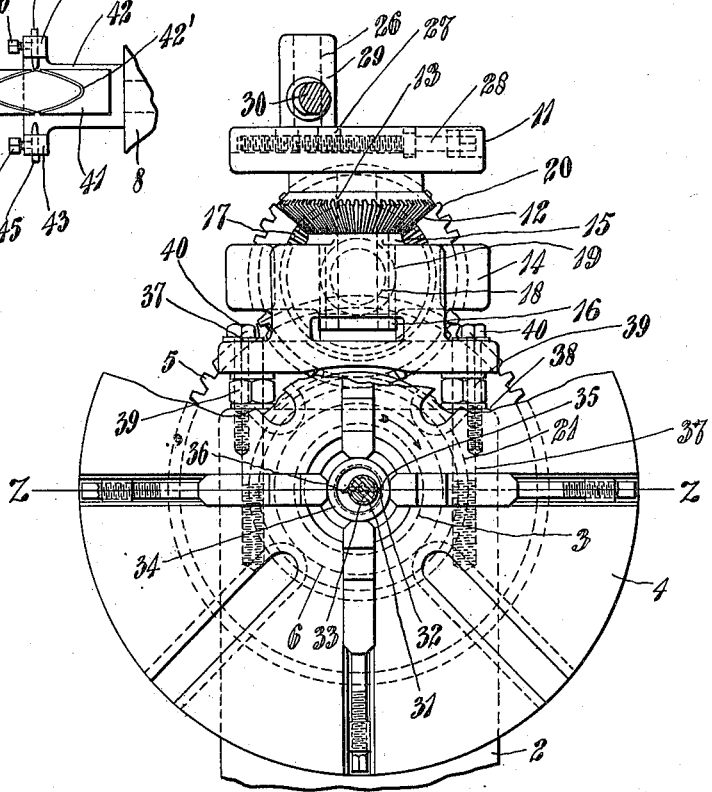
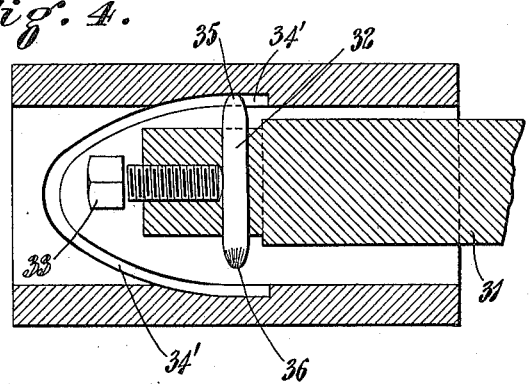
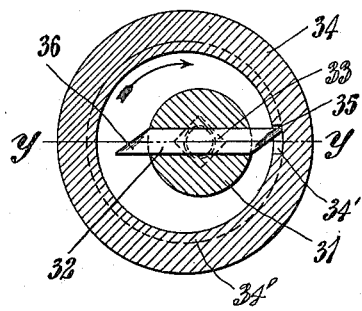
Witnesses:
Clarence Perdew
Catherine Doran
Inventor
Oscar W. Mueller
By James N. Ramsey
Attorney

UNITED STATES PATENT OFFICE.

OSCAR W. MUELLER, OF CINCINNATI, OHIO.

TURNING OR BORING APPLIANCE.

1,153,241.	Specification of Letters Patent.	Patented Sept. 14, 1915.

Application filed June 13, 1914. Serial No. 844,860.

*To all whom it may concern:*

Be it known that I, OSCAR W. MUELLER, a citizen of the United States, and a resident of Cincinnati, in the county of Hamilton and State of Ohio, have invented certain new and useful Improvements in Turning or Boring Appliances, of which the following is a specification.

My invention relates to turning and boring; and its object is to provide simple means for quickly and economically cutting correct grooves in the cylindrical interiors of successive bearings or the like, these grooves generally being provided to distribute the lubricant in the bearing.

My invention consists in the parts and in the details of construction and arrangement of parts as will hereinafter be more fully described and claimed.

In the drawings: Figure 1 is a side elevation of a device embodying my invention, also showing parts of a turret lathe to which it is applied; Fig. 2 is a cross sectional elevation on the line $x$—$x$ of Fig. 1, looking to the left toward the spindle of the lathe; Fig. 3 is an enlarged vertical cross section through a bearing, and the tool and its holder operating under the interior of the bearing; Fig. 4 is a horizontal cross section on the line $y$—$y$ of Fig. 3; and Fig. 5 is a horizontal cross section on a line corresponding to the line $z$—$z$ of Fig. 2, but showing a modified holder with tools working on the convex surface of a shaft instead of on the interior of a bearing.

I have chosen for illustration of the use of my invention a turret lathe of which are shown only the parts more intimately associated with my invention, these being the bed 1 with a bearing 2 for the spindle 3; the chuck 4 on the spindle, and, as here shown, a gear 5 on the spindle 3 on the side of the bearing 2 opposite from the chuck forming a part of the driving mechanism of the lathe, and having a hub 6; and a carriage 7 carrying the turret 8 in a cross slide 9 manipulated by the handle 10. It will be understood that the carriage 7 may have suitable mechanism for sliding it longitudinally of the bed 1 to bring the tools carried in the turret 8 successively to the work carried in the chuck 4.

If the bearing or other piece of work is rotated concentric with its cylindrical interior and a cutter is simultaneously reciprocated axially of the cylindrical interior and in cutting contact with the concave surface of said interior; and if the reciprocations are synchronous with the rotations of the work, the cutter will travel over the same path continuously, and if fed radially of the cylindrical interior, will cut deeper at each travel over the path, so that a groove may be cut of any depth desired; and if one reciprocation of the cutter be given for each rotation of the cylindrical interior, the groove will be in the form of an ellipse with ends near respective ends of the cylindrical interior but at opposite sides thereof. If the rotation of the work be stopped and a cutter applied diametrically opposite from the place of stoppage and then the operation resumed, another ellipse will be cut, crossing the first ellipse midway of the lengths of the two ellipses, and with ends diametrically opposite respective ends of said first ellipse. Such combination of the elliptical grooves in the cylindrical interior of a bearing provides a highly satisfactory lubricant distribution system in the bearing, and with the use of my invention it may be very economically produced.

As exemplified herein, the device for operating as above described comprises a crank disk 11 fixed together with a bevel gear 12 on a vertical shaft 13. A bracket 14 is bolted to the top of the bearing 2 of the lathe, and this bracket 14 has a bearing 15 for the vertical shaft 13, said shaft being held down therein by a collar 16 on the lower end of the shaft. A bevel gear 17 is in mesh with the bevel gear 12, and is fixed on a shaft 18 which turns in a bearing 19 in the bracket 14 and extends rearwardly and has a spur gear 20 fixed on it, which spur gear is in mesh with a spur gear 21 fixed on the hub 6 of the gear 5 of the spindle 3 of the lathe. The spur gears 20 and 21 are of equal diameter, and the bevel gears 12 and 17 are miter gears, so that the crank disk 11 is turned once for each turn of the spindle 3 of the lathe. Fixed on top of the turret 8 is a pedestal 22 with a socket 23 in its upper end. A clamping head 24 has a shank 25 bearing in the socket 23, so that the clamping head may turn in a horizontal plane with respect to the pedestal 22; or the turret 8, with the pedestal, may turn with respect to the clamping head, to bring successive tools into operative position. On the crank disk 11 is a wrist pin 26 carried in a radial slide 27 on the crank disk, which slide is adjusted radially by means of a screw 28. A head 29 slips onto this wrist pin 26, and in it is fixed a connecting bar 30 which extends horizontally over and through the clamping head 24. This clamping head is clamped to the bar 30 at any longitudinal adjustment of the carriage 7 of the lathe; and by means of the radial slide 27 in the crank disk 11 the wrist pin 26 may be fixed at any desired distance from the center of the crank disk.

From the foregoing it will be seen that at each revolution of the crank disk corresponding with a revolution of the lathe spindle, the carriage 7 will be reciprocated once through the medium of the pitman bar 30 and the other connecting parts just described. By varying the radial distance of the wrist pin 26 from the center of the crank disk 11 the stroke or the length of this reciprocation of the carriage 7 may be varied.

When using my invention, one of the holders of the turret 8 receives a bar 31 which has, horizontally through it, a cutter 32 fixed therein by means of a set screw 33 in the end of the bar 31. As shown, this cutter 32 extends horizontally outward on both sides of the bar 31, and, accordingly as the bar 31 is brought close to one side or the other of the cylindrical interior of the work 34, the cutter 32 will cut with one projecting end 35 or the other projecting end 36, to cut one or the other of the two elliptical grooves 34' which were hereinbefore described. Since it is not desirable to reverse the rotation of the work when the cutter is transferred from one side to the other thereof, the cutter 32 has its opposite ends 35 and 36 oppositely directed, because the interior surface of the work is moving down on one side of the center and up on the other.

The nature of the motion imparted to the bar 31 carried in the turret 8 is such that it moves very slowly near the ends of its stroke while the rotation of the work is uniform; and this results in a well rounded end for the ellipse without any sharp angles. As a result of this slow motion at the ends of the stroke the cutting at the ends of the ellipse is performed almost entirely by virtue of the rotary motion of the work, whereas in the middle portions of the ellipse the cutting is due both to the rotation of the work and the longitudinal movement of the cutter. For this reason, the cutter presents its edge practically in a horizontal plane; so that it will be substantially transverse of the nearly circumferential path of the cutter at the end of the ellipse; and from there is presented increasingly diagonally of the path until the middle of the ellipse is reached, when the cutter is traveling along the path practically edgewise; and, if only the longitudinal motion entered into the operation, would merely cut a narrow groove of V-shaped cross section like the shape of the end of the cutter; but here the rotary motion of the work contributes to the width of the cut with the result that, in practice, the groove following the elliptical path around the cylindrical interior from one side to the other is of practically uniform width and shape of cross section throughout its extent.

It will be seen that the length of the ellipse may be varied by varying the stroke of the carriage carrying the cutter, and the ellipse may be located along the interior of the work by bringing the carriage up and clamping it by means of the clamping head 24 to the bar 30 at the proper point therealong. As before alluded to, the cutter may be fed into the work by moving the cross slide 9 across by turning the crank 10. This means also may be used to transfer the cutter to the other side of the work, to cut the other ellipse, an opposite turning of the crank then serving to feed the cutter into the work.

It will be seen that the turret 8 may carry other tools to perform other operations on the work 34, and while these tools are in use the mechanism of my invention may be disconnected by raising the bar 30, which will pull the head 29 off the wrist pin 26 and raise the shank 25 of the clamping head 24 out of the socket 23 in the pedestal 22. This bar 30 and these parts may be laid aside without disturbing the adjustment of the clamping head 24 along the bar 30, then leaving the carriage 7 and turret 8 uninfluenced by the mechanism geared to the lathe spindle, so that the lathe may be used in the ordinary manner of using a turret lathe. Then, in similarly finishing a considerable number of pieces of work, when the next piece is to have the grooves cut, it is necessary only that it be set in the chuck 4 in the same relative position that the last piece of work was set, and when the bar 30 is again connected to the crank disk 11 by slipping the head 29 over the wrist pin 26, and the carriage 7 brought to the position where it will receive the shank 25 in the socket 23, the operator will be assured that the cutter 32 is in the proper relative position longitudinally to properly locate the ellipse in the interior of the work, and it is necessary only to start the rotation of the work, which will also start the reciprocation of the cutter, and then begin to feed the cutter into the work by turning the handle 10 of the cross slide 9.

As here shown, the bracket 14 is fixed very rigidly on top of the bearing 2 by providing studs 37 screwed into the lower part of the bearing and receiving the cap 38 of the bearing with nuts 39 screwed down on the studs against the cap, leaving the upper ends of the studs 37 projecting through snugly fitting openings in the bracket 14. A cap screw 40, passing down through the bracket into the cap 38 of the bearing 2, holds the bracket 14 firmly down on top of the nuts 39, and the four studs 37 rigidly hold the bracket against vibration in a horizontal plane. A rigid mounting of this bracket is important, since it must provide the reaction for the entire action of reciprocating the cutter 32, and any movement of the bracket 14 will result in irregularity of this reciprocation.

It will be understood that the appliance is equally well adapted for use with any other lathe or other machine in which the rotating work and reciprocating cutter may be brought into proper juxtaposition. For instance, on an engine lathe, the gearing on the bracket 14 or other suitable bracket may be mounted adjacent to the spindle of the lathe with a gear corresponding to the gear 21 mounted at some suitable place to rotate with the spindle, and the pedestal 22 or other suitable element may be mounted on the carriage of the lathe, so that the carriage will be reciprocated at each rotation of the spindle in a manner similar to the reciprocation of the carriage 7 of the turret lathe. When the appliance is thus to be used, the carriage may be disconnected from the lead screw, so as to reciprocate freely under the action of the mechanism of my invention; every lathe being provided with some convenient means for effecting this release and as conveniently connecting the carriage again to the lead screw when my appliance is not to be used. The removal of the connecting bar 30 as before described, will, in these instances, also be very convenient; and, at any time, the connecting bar will serve as a gage to bring the cutter to the required location longitudinally of the next piece of work, so that the cutting of all the pieces will be alike.

It is sometimes desirable to have lubricant distributing grooves cut on the convex surface of the shaft instead of on the interior of the bearing, and my invention is also adapted for this work by being arranged substantially as shown in Fig. 5. Here the shaft 41 is held in the chuck 4 in a usual manner, but the turret 8 carries a modified holder 42 extending below the shaft and having upwardly extended bifurcations 43 which carry the tools or cutters 44 and 45 directed inwardly toward the shaft 41 in the horizontal plane of its center line, and held by screws 46. Thus the cross feed of the turret carriage, or of the carriage of any other lathe, may be used to feed one or the other of the tools 44 or 45 to the work on either side; and the elliptical grooves 42' may be cut on the convex surface of the shaft, each ellipse having its opposite end on a diametrically opposite side of the shaft as were the elliptical grooves in the interior of the bearing. The same facility of operation in cutting first one groove and then the other and having them accurately located along the shaft as well as with respect to each other, is possible, as was before described in connection with the cutting of such grooves on the interior of a bearing.

From the foregoing it will be understood that my invention is capable of considerable modification, and therefore I do not wish to be understood as being limited to the examples herein shown and mentioned, but

What I claim as new and desire to secure by Letters Patent is:

1. In combination with means for concentrically rotating an object having a cylindrical surface, cutting means adapted to engage with said surface at either one of diametrically opposite sides thereof, means for shifting said cutting engagement from the one side to the other, and means for reciprocating the cutting means synchronously with the rotation of the object.

2. In combination with a lathe comprising a chuck adapted to hold and concentrically rotate an object having a cylindrical surface, means for rotating said chuck, and a rotatable and reciprocatable turret adapted to hold a plurality of tools to be operatively applied to said surface successively by rotation and reciprocation of the turret, a cutter carried as one of said tools in said turret to bear on said surface of said object held by said chuck, reciprocating means operated in conjunction with the means for rotating said chuck for reciprocating said turret synchronously with the chuck and the object held therein, and operative connection from said reciprocating means to said turret, said operative connection being detachable from said turret to leave the turret free from reciprocation of the reciprocating means, whereby the turret may be rotated and reciprocated to apply tools held thereby, other than said cutter, to said object.

3. In combination with means for concentrically rotating an object having a cylindrical surface, a cutter, means for holding said cutter against said surface, means for reciprocating said cutter synchronously with the rotation of the object, and means to vary the length of reciprocation, said reciprocating means having detachable operative connection with the cutter and from the reciprocating means, and forming a gage for proper location of the cutter on objects successively and uniformly held by the rotating means.

4. In combination with means for concentrically rotating an object having a cylindrical surface, a cutter, means for holding said cutter against said surface, means for reciprocating said cutter synchronously with the rotation of the object, operative connection from the reciprocating means to the cutter, adjustable in its connection with the cutter, to vary the location of the reciprocation of the cutter longitudinally of said object, and means to vary the length of reciprocation, said reciprocating means having detachable operative connection with the cutter, and from the reciprocating means, and forming a gage for proper location of the cutter on objects successively and uniformly held by the rotating means.

5. In combination with means for concentrically rotating an object having a cylindrical surface, a cutter having opposite cutting ends, means for holding said cutter against said surface, means for reciproating said cutter synchronously with the rotation of the object, operative connection from the reciprocating means to the cutter, adjustable in its connection with the cutter, to vary the location of the reciprocation of the cutter longitudinally of said object, said reciprocating means having detachable operative connection with the cutter, and means for feeding the cutter toward the surface of the object, said means also being adapted for transferring the cutting engagement from one side of the surface to the diametrically opposite side thereof, and for feeding the cutter to said diametrically opposite side when transferred.

6. In combination with means for concentrically rotating an object having a cylindrical surface, a cutter having opposite cutting ends, means for holding said cutter against said surface, means for reciprocating said cutter synchronously with the rotation of the object, means to vary the length of reciprocation, said reciprocating means having detachable operative connection with the cutter, and means for feeding the cutter toward the surface of the object, said means also being adapted for transferring the cutting engagement from one side of the surface to the diametrically opposite side thereof, and for feeding the cutter to said diametrically opposite side when transferred.

7. In combination with means for concentrically rotating an object having a cylindrical surface, a cutter having opposite cutting ends, means for holding said cutter against said surface, means for reciprocating said cutter synchronously with the rotation of the object, operative connection from the reciprocating means to the cutter, adjustable in its connection with the cutter, to vary the location of the reciprocation of the cutter longitudinally of said object, means to vary the length of reciprocation, said reciprocating means having detachable operative connection with the cutter, and means for feeding the cutter toward the surface of the object, said means also being adapted for transferring the cutting engagement from one side of the surface to the diametrically opposite side thereof, and for feeding the cutter to said diametrically opposite side when transferred.

8. In combination with a lathe comprising a spindle, and means on the spindle for concentrically holding an object having a cylindrical surface, and a carriage reciprocatable in direction axially of the spindle and of the concentrically held object, a cutter bearing against the cylindrical surface, a holder carried by the carriage and carrying the cutter, a crank rotatably mounted on the lathe, a pitman pivoted to the crank and to the carriage, and operative connection from the crank to the spindle, whereby the crank is rotated and reciprocates the carriage and the cutter synchronously with the rotation of the spindle, said pitman being removable from the crank and from the carriage, but acting as a gage to properly position the carriage when again applied to the crank and carriage.

9. In combination with a lathe comprising a spindle, and means on the spindle for concentrically holding an object having a cylindrical surface, and a carriage reciprocatable in direction axially of the spindle and the concentrically held object, a cutter bearing against the cylindrical surface, a holder carried by the carriage and carrying the cutter, a crank mounted on the lathe to rotate around an axis at right angles to that of the spindle, a geared operative connection between the spindle and the crank, whereby the spindle rotates the crank, a pedestal fixed on the carriage, said crank comprising a wrist, a pitman rod, a head on the pitman rod fitting on said wrist, a clamping head clamped on the pitman rod, said pedestal having a socket, and a shank on the clamping head and extending into the socket, whereby the rotation of the crank reciprocates the carriage and the cutter synchronously with the rotation of the spindle and the object held on the spindle, said pitman rod having its head removable from said wrist, and the shank of its clamping head removable from the socket in the pedestal to remove the cutter from the object, but acting as a gage to again properly locate the cutter with respect to the same on a successively and uniformly held object.

10. In combination with a lathe comprising a spindle, and means on the spindle for concentrically holding an object having a cylindrical surface, and a carriage reciprocatable in direction axially of the spindle and the concentrically held object, a cutter bearing against the cylindrical surface, a holder carried by the carriage and carrying the cutter, a crank mounted on the lathe to rotate around an axis at right angles to that of the spindle, a geared operative connection between the spindle and the crank, whereby the spindle rotates the crank, a pedestal fixed on the carriage, said crank comprising a wrist, a pitman rod, a head on the pitman rod fitting on said wrist, a clamping head clamped on the pitman rod, said pedestal having a socket, and a shank on the clamping head and extending into the socket, whereby the rotation of the crank reciprocates the carriage and the cutter synchronously with the rotation of the spindle and the object held on the spindle, said pitman rod having its head removable from said wrist, and the shank of its clamping head removable from the socket in the pedestal to remove the cutter from the object, but acting as a gage to again properly locate the cutter with respect to the same on a successively and uniformly held object, said clamping head being releasable from the pitman bar to be clamped at various locations therealong, to variously locate the carriage and the cutter.

11. In combination with a lathe comprising a spindle, and means on the spindle for concentrically holding an object having a cylindrical surface, and a carriage reciprocatable in direction axially of the spindle and the concentrically held object, a cutter bearing against the cylindrical surface, a holder carried by the carriage and carrying the cutter, a crank mounted on the lathe to rotate around an axis at right angles to that of the spindle, a geared operative connection between the spindle and the crank, whereby the spindle rotates the crank, a pedestal fixed on the carriage, said crank comprising a wrist, a pitman rod, a head on the pitman rod fitting on said wrist, a clamping head clamped on the pitman rod, said pedestal having a socket, and a shank on the clamping head and extending into the socket, whereby the rotation of the crank reciprocates the carriage and the cutter synchronously with the rotation of the spindle and the object held on the spindle, said pitman rod having its head removable from said wrist, and the shank of its clamping head removable from the socket in the pedestal to remove the cutter from the object, but acting as a gage to again properly locate the cutter with respect to the same on a successively and uniformly held object, said wrist being mounted on said crank for adjustment radially thereof to vary the length of reciprocation of the carriage as imparted by said crank, and said clamping head being releasable from the pitman bar to be clamped at various locations therealong, to variously locate the carriage and the cutter.

12. In combination with a lathe comprising a spindle, and means on the spindle for concentrically holding an object having a cylindrical surface, and a carriage reciprocatable in direction axially of the spindle and the concentrically held object, a cutter having opposite cutting ends, either of which is adapted to bear against the cylindrical surface, a holder carried by the carriage and carrying the cutter, said carriage comprising a cross feed carrying the holder and the cutter, whereby the cutter is fed into engagement with the object and whereby the cutting engagement may be transferred from one side of the object to the diametrically opposite side thereof, a crank rotatably mounted on said lathe, operative connection from the spindle to the crank, and a pitman bar connecting the crank to the carriage, whereby the carriage is reciprocated synchronously with the rotation of the spindle and of the object held on the spindle.

13. In combination with a lathe comprising a spindle, and means on the spindle for concentrically holding an object having a cylindrical surface, and a carriage reciprocatable in direction axially of the spindle and the concentrically held object, a cutter having opposite cutting ends, either of which is adapted to bear against the cylindrical surface, a holder carried by the carriage and carrying the cutter, a crank disk, geared operative connection between the spindle and said crank disk, whereby the crank disk is rotated, a radial slide on the crank disk, a screw for adjusting this slide, a wrist pin fixed in the slide, a pedestal fixed on the carriage and having a socket in its upper end, a pitman bar, a head fixed on one end of the pitman bar and fitting on the wrist pin, a clamping head clamped on the pitman bar, and a shank on the clamping head extending into the socket on the pedestal, said head being upwardly removable from said wrist pin, and said shank being upwardly removable from said socket, whereby the pitman bar is readily disconnected from the crank disk and from the carriage, said carriage comprising a cross feed by means of which the cutter may be brought into cutting engagement with either one of diametrically opposite sides of the cylindrical surface of the object and fed against either side to cut a groove therein, the radial slide of the crank disk enabling the stroke of the cutter to be adjusted, and the clamping head being adapted to be clamped to the pitman bar at various locations therealong, to variously locate the cutter along said cylindrical surface of the object.

14. In combination with a lathe comprising a spindle and means on the spindle for concentrically holding an object having a cylindrical surface, and a carriage reciprocatable in direction axially of the spindle and the concentrically held object, a cutter carried by said carriage to bear against the cylindrical surface, a bracket rigidly mounted on the lathe over the spindle, a shaft vertically mounted in the bracket, a shaft horizontally mounted in the bracket, miter gears on these shafts, respectively, meshing together, a spur gear fixed on the horizontal shaft in the bracket, meshing with and of equal diameter with the spur gear rotating with said spindle, a crank rotating with the vertical shaft in the bracket, and a pitman pivoted to the crank and to the carriage, whereby the crank reciprocates the carriage.

15. In combination with a lathe comprising a spindle and means on the spindle for concentrically holding an object having a cylindrical surface, and a carriage reciprocatable in direction axially of the spindle and the concentrically held object, a cutter carried by said carriage to bear against the cylindrical surface, a bracket rigidly mounted on the lathe over the spindle, a shaft vertically mounted in the bracket, a shaft horizontally mounted in the bracket, miter gears on these shafts, respectively, meshing together, a spur gear fixed on the horizontal shaft in the bracket, meshing with and of equal diameter with the spur gear rotating with said spindle, a crank rotating with the vertical shaft in the bracket, a pedestal fixed on the carriage, a pitman bar, means for pivotal engagement between the pitman bar and said crank, and means for pivotal engagement between the pitman bar and the pedestal, the respective means for engagement being freely disengageable upward from said crank and said pedestal, whereby the pitman bar is readily disconnected and removed from the device.

OSCAR W. MUELLER.

Witnesses:
JAMES N. RAMSEY,
CATHERINE DORAN.

Copies of this patent may be obtained for five cents each, by addressing the "Commissioner of Patents, Washington, D. C."